United States Patent [19]

Martin

[11] 4,430,211
[45] Feb. 7, 1984

[54] VIBRATING SCREEN

[75] Inventor: Otto H. J. Martin, Hattingspruit, South Africa

[73] Assignee: Damar Manufacturing Company, Hattingspruit, South Africa

[21] Appl. No.: 332,376

[22] Filed: Dec. 21, 1981

[30] Foreign Application Priority Data

Oct. 13, 1980 [ZA] South Africa ................. 80/6290

[51] Int. Cl.³ .............................................. B07D 1/38
[52] U.S. Cl. ................................. 209/314; 209/365 R; 209/402; 209/403
[58] Field of Search ................... 209/314, 310, 365 R, 209/401–403

[56] References Cited

FOREIGN PATENT DOCUMENTS 324249 7/1971 Austria .
2131976 2/1973 Fed. Rep. of Germany ...... 209/310
674923 12/1947 United Kingdom .

Primary Examiner—Frank Sever
Attorney, Agent, or Firm—Jeffers, Irish & Hoffman

[57] ABSTRACT

The invention provides a screening arrangement including a screen deck constituted by a non-stretchable, flexible screen cloth material defining a feed end and a discharge end. The feed end and discharge end are secured to mounting formations associated with a frame and the association is such that in use the screen deck may be reciprocated between a taut state and a slack state. The screen deck is located at an angle to the horizontal sloping downwardly from the feed end to the discharge end. The arrangement of the present invention has a high resistance against blinding of the screen deck.

4 Claims, 3 Drawing Figures

VIBRATING SCREEN

This invention relates to industrial vibrating screen arangements.

BACKGROUND OF THE INVENTION

Vibrating screen arrangements have been in use for many years in the industrial field for screening or and for dewatering wet material. Conventionally the arrangements comprise a working member mounted on a frame and an exciter arranged to impart vibrating motion to the working member. The working member is fitted with a screen deck which is conventionally a rigid apertured element which may be made up of a plurality of screening panels.

Despite the fact that the working member is vibrated in use, blinding of the apertures often occur. To counter this phenomenon it is known to make use of steel balls which are so located in the arrangement as to expel blinding material from the apertures in use. The use of steel balls has a disadvantage in that it reduces the working life of the screen deck. It is also known to make use of so-called wedge wire screen decks which are wire screens designed to reduce the tendency of blinding. These screens are however relatively expensive.

It is accordingly an object of the present invention to provide an arrangement which has certain advantages over known screening arrangements.

SUMMARY OF THE INVENTION

According to the invention a screening arrangement defining a feed end and a discharge end comprises an elongated frame extending between the feed end and a discharge end, transverse mounting formations associated with the frame, at least one of which is located at or towards each of the feed and discharge ends, a screen deck constituted by a non-stretchable flexible screen cloth material extending between and secured to the mounting formations, at least one of the mounting formations being reciprocally moveable relative to the frame between a first extremity at which the screen deck is in a taut state and a second extremity at which the screen deck is in a slack state, and means adapted in use to reciprocate the moveable mounting formation between its extremities of movement, the arrangement being such that in operative disposition of the screening arrangement, the screen deck slopes downwardly from the feed end to the discharge end.

Preferably the screen deck is constituted by a plurality of screen cloth segments each defining a feed end and a discharge end and each secured to a pair of spaced mounting formations, adjacently disposed segments being arranged in overlapping relationship.

The screen cloth material may be of any suitable polymeric material. Thus the screen cloth may be woven polyurethane.

In one form of the invention both mounting formations may be reciprocally moveable relative to the frame, the arrangement being such that the pair of mounting formations to which a single segment of screen cloth is secured, is arranged to move in antiphase to reciprocate that segment between a taut and a slack state in operation.

Preferably the mounting arrangements may be secured to or form part of the swinging masses of a double deck resonant screen arrangement.

Each screen cloth segment may be secured at its feed end to a mounting arrangement secured to the bottom swinging mass and at its discharge end to the top swinging mass of the double deck resonant screen arrangement, the screen arrangement being located in use so that the screen cloths slope downwardly from their feed to their discharge ends.

The mounting means may include a tensioning arrangement by which the tension in the screen cloths may be adjusted.

An example of the present invention will now be described with reference to the accompanying drawings.

DESCRIPTION OF THE PREFERRED EMBODIMENT

Figure 1:
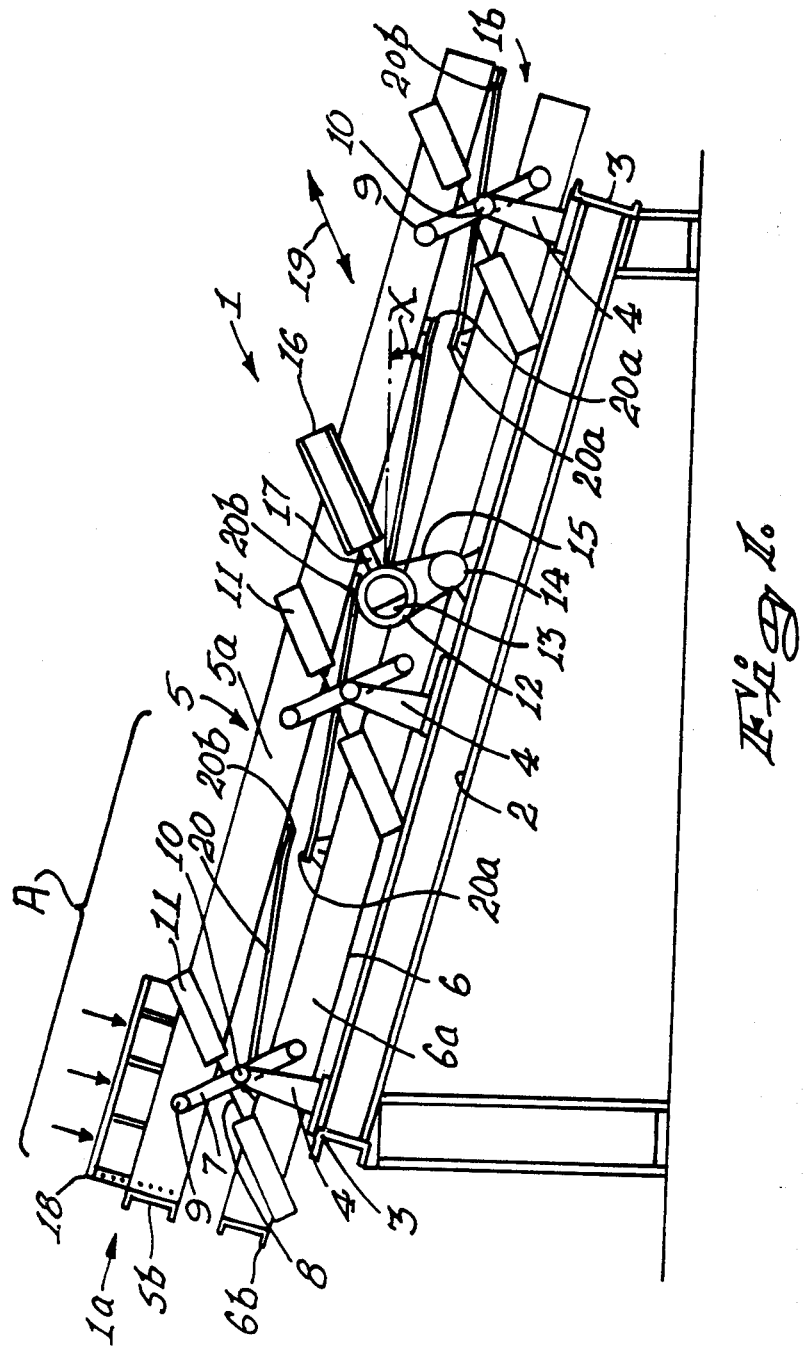
FIG. 1 is a schematic side elevation of a screening arrangement according to the invention.

In the accompanying drawings is illustrated a vibratory machine 1 conventionally used as a double deck resonant screen. The illustrated machine is of a type marketed by Binder & Company of Gleisdorf, Austria and their licensees and has been modified to constitute a screening arrangement according to the present invention.

The vibratory machine 1 comprises a frame made up of longitudinal members 2, transverse members 3 and upstanding supports 4. It further includes an upper swinging mass 5 and a lower swinging mass 6 which are interconnected by means of rigid link arms 7 and spring connecting plates 8. The swinging masses 5 and 6 comprise rectangular frame structures made up of longitudinal elements 5a, 6a and transverse elements 5b and 6b respectively.

The link arms 7 are pivotably connected to the swinging masses (5, 6) via rubber bushes shown at 9 and the link arms 7 are centrally mounted on transverse axles (not shown). The axles are in turn mounted to the upstanding supports 4 via rubber bushes 10 for pivotal motion relative thereto.

The connecting plates are connected to the swinging masses (5, 6) via rubber packed boxes 11.

A transverse drive shaft (not shown) is mounted on the lower swinging mass 6 through the agency of a suitable bearing arrangement (not shown). A pully 12 is mounted on the shaft which shaft also carries a pair of eccentric weights at its free ends. One of the weights is illustrated at 13. The shaft and weights 13 are driven via a V-belt 15 by a motor 14, which is mounted on the frame member 2. It will be seen that the eccentric weight 13 and its associated mounting means and drive means constitute an exciter for the bottom swing mass 6. The exciter also has associated with it a drive box 16 which is secured to the upper swinging mass 5. A lignum spring 17 extends between the drive box 16 and the exciter. The lignum spring 17 is mounted in the drive box 16 by means of a packing of rubber slabs.

The upper swinging mass 5 is also fitted with a feed box 18.

The arrangement thusfar described with reference to FIG. 1 is, as stated above, a known arrangement and the arrangement will therefor not be described in more detail.

Due to the mounting of the swinging masses as described above, the orbiting force set up by the eccentric weights 13 upon rotation is translated to the swinging masses and sets up a substantially linear movement in the swinging masses in the direction indicated by the arrows 19.

Figure 2:
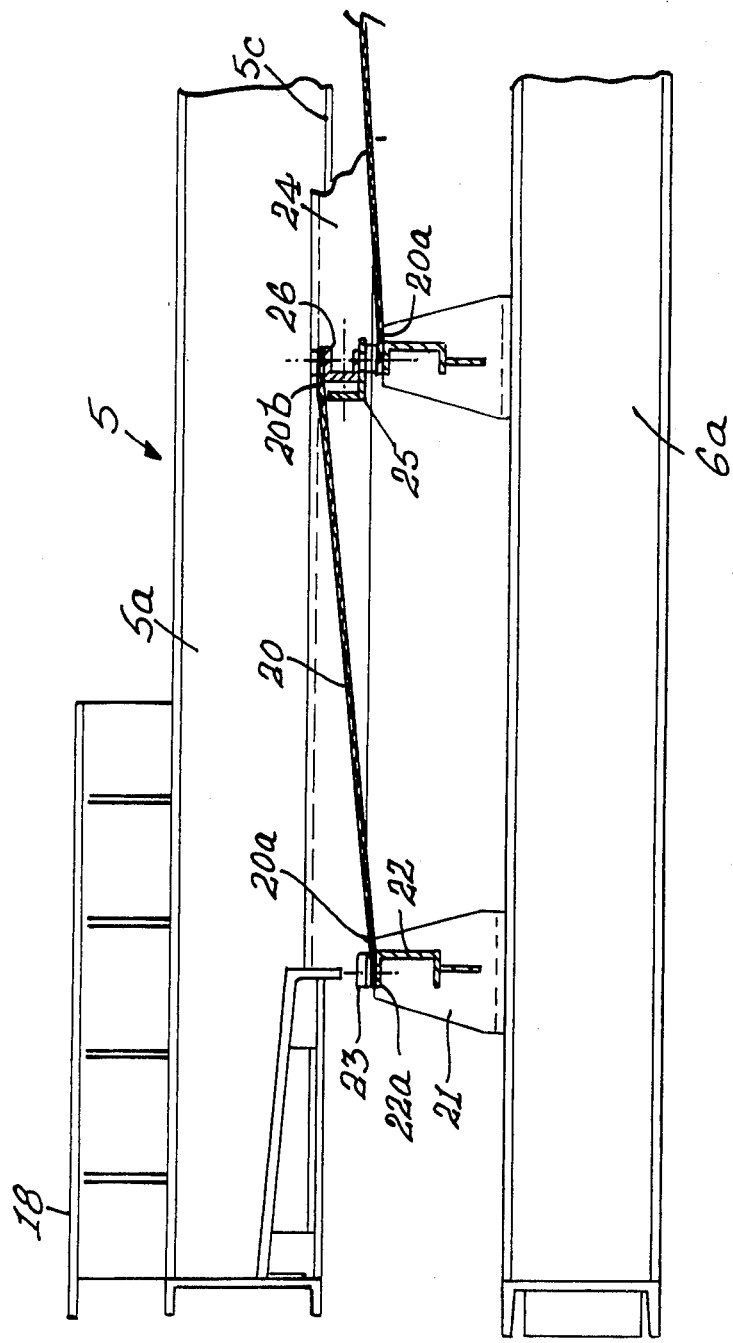
FIG. 2 is a more detailed sectional side elevation of the end zone A of the screening arrangement of FIG. 1.
Figure 3:
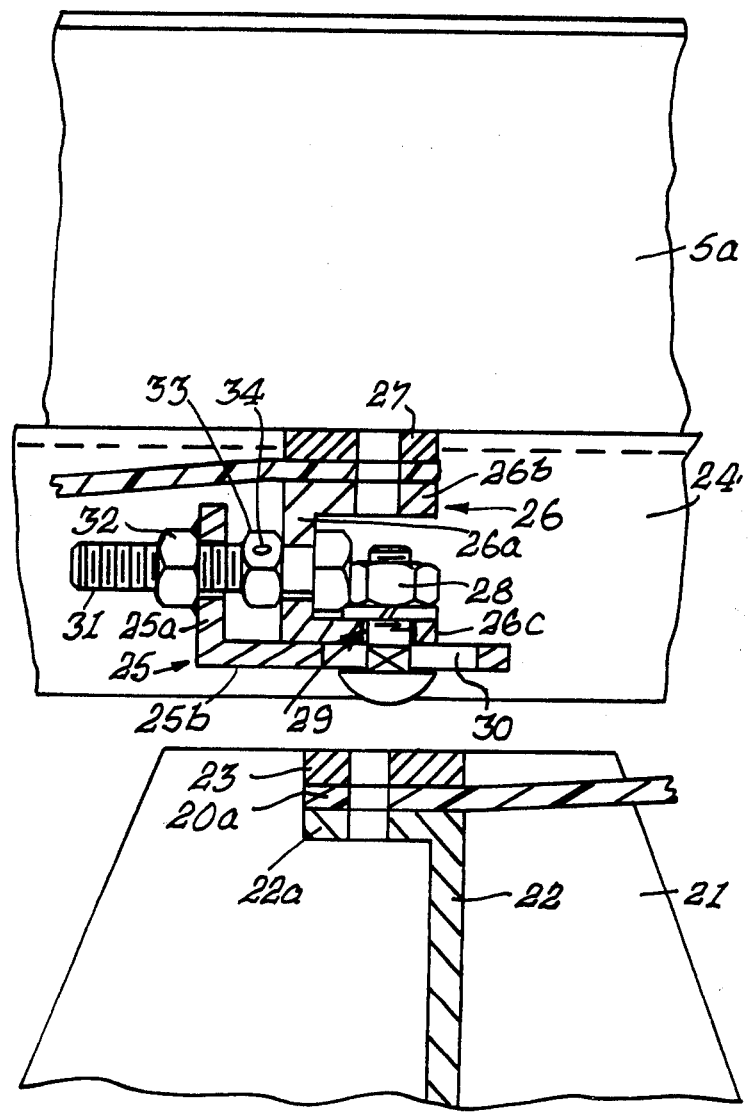
FIG. 3 is a detailed sectional side view of the mouting arrangement indicated at B in FIG. 2.

The modification of the machine described above to a screening machine according to the present invention is illustrated in FIG. 1 and in more detail in FIGS. 2 and 3. A number of flexible, non-stretchable polyurethane screen cloth segments 20 are secured between the upper and lower swinging masses (5, 6). It can be seen that each segment 20 defines a feed edge 20(a) and a discharge edge 20(b) which are arranged so that the discharge edge 20(b) of a particular segment overlaps the feed edge 20(a) of an adjacently located segment 20.

The vibrating machine 1 is conventionally used in horizontal position i.e. with the member 2 horizontally disposed. For the present application it is located at an angle sufficient to have the screen cloth segments 20 sloping downwardly at an angle of about 5° to the horizontal as indicated at X. The precise angular position will however change depending on the application to which the screen is put.

The lower swinging mass 6 is provided with pairs of upstanding supports 21 (See FIG. 2) bolted onto the longitudinal members 6(a). Between each pair of upstanding supports 21 a transverse channel section 22 is welded. The feed end 20(a) of a screen cloth segment 20 is mounted on and secured to the upper limb 22(a) of the transverse channel 22 by sandwiching it between the limb 22(a) and a clamp plate 23 and securing the plate 23 to the limb 22(a) by means of bolts and nuts (not shown).

The upper swinging mass 5 has as stated before, a longitudinal member 5(a) which is constituted by an inwardly facing channel section. Onto the lower limb 5(c) of the two channel members 5(a) is mounted a depending angle section 24 by means of bolts (not shown).

A transverse L-shaped angle section support 25 is welded between the two angle sections 24 to extend at a right angle to the longitudinal centre line of the swinging mass 5.

The L-shaped angle section support 25 defines a first limb 25(a) and a second limb 25(b) which will hereinafter respectively be referred to as the vertical limb 25(a) and the horizontal limb 25(b). It will be understood however that in use these limbs will not be disposed in true vertical and horizontal planes.

The upper surface of the horizontal limb 25(b) of the support 25 constitutes a platform onto which a mounting channel 26 is received.

The mounting channel 26 defines a web 26(a), an upper limb 26(b) and a lower limb 26(c).

The discharge end 20 (b) of the screen cloth 20 is sandwiched between a clamp plate 27 and the upper surface of the limb 26(b) of the mounting channel 26 by means of bolts (not shown) passing through apertures provided in the plate 27 and the limb 26(b).

The mounting channel 26 is secured to the support 25 by means of locking nut and bolt arrangement 28 which passes through an aperture 29 provided in the limb 26(c) of the mounting channel 26 and an elongated slot 30 in the horizontal limb 25(b) of the support 25.

Adjustability of the position of the mounting channel 26 on the support 25 is effected by means of the bolt 31. This bolt 31 passes through an aperture in the web 26(a) of the support 26 and an aperture through the vertical member 25(a) of the support 25. Onto the vertical member 25(a) of the support there is welded a nut 32 into which the bolt 31 is received. A spacer nut 33 fitted with a locking pin 34 is located on the bolt 31 between the web 26(a) of the mounting channel and the vertical member 25(a) of the support 25.

It will be seen that by turning bolt 31 the mounting channel 26 will be moved relative to the support 25 thereby causing tensioning or slackening of the screen cloth segment 20. Once the desired degree of tension has been achieved the mounting channel may be clamped in position by means of bolt 28 and its associated nut 28(a).

With the arrangement set out above the reciprocal movement in anti-phase of the swinging masses 5 and 6 causes alternating slackening and tightening of the screen cloth segments 20. As the screen cloth segments, which collectively define a screen deck, is placed at a slight downward slope, material placed on the deck will be propelled from the feed end 1(a) of the screen arrangement 1 towards its discharge end 1(b).

The constant movement of the screening surface and the positive displacement of matter thereon counteracts the blinding tendency often experienced with screening arrangements presently in use.

I claim:
1. A screening arrangement defining a feed end and a discharge end, comprising:
   two frame-like movable masses being vertically spaced-apart and interconnected by linkage members, said two masses being movable in substantially opposite directions relative to each other,
   an exciter connected to said arrangement to impart substantially reciprocable movement to said masses to move said masses in substantially opposite directions relative to each other,
   a screen made of substantially non-stretchable, flexible material connected at one end thereof to one of said two masses and connected at its opposite end thereof to the other one of said two masses,
   said screen being movable by said two masses between a first position wherein said screen is taut and a second postion wherein said screen is slack,
   said two masses being arranged to slant said screen downwardly from said feed end to said discharge end,
   said screen being secured at its end facing said feed end to the bottom one of said two masses and at its end facing said discharge end to the top one of said two masses.
2. The screening arrangement of claim 1 including a plurality of said screens arranged in end overlapping relationship.
3. The screening arrangement of claim 2 wherein each said screen is secured to rails which extend transversely to the longitudinal direction of said masses, at least one of said rails of each said screen being adjustable in the longitudinal direction of the frame and securable in place.
4. The screening arrangement of claim 1 wherein said screen is made of a woven polyurethane material.

* * * * *

UNITED STATES PATENT AND TRADEMARK OFFICE
CERTIFICATE OF CORRECTION

PATENT NO. : 4,430,211

DATED : February 7, 1984

INVENTOR(S) : O.H.J. Martin

It is certified that error appears in the above—identified patent and that said Letters Patent is hereby corrected as shown below:

```
On the title page
On the abstract, Page 1, the name of the Assignee
should be changed from "Damar" to --Dabmar--.

In Claim 4, in Col. 4, line 66, change "claim 1"
to --claim 3--.
```

Signed and Sealed this

Thirty-first Day of July 1984

[SEAL]

Attest:

GERALD J. MOSSINGHOFF

Attesting Officer

Commissioner of Patents and Trademarks